United States Patent [19]

Suzuki

[11] Patent Number: 4,634,219
[45] Date of Patent: Jan. 6, 1987

[54] OPTICAL LOW-PASS FILTER

[75] Inventor: Takashi Suzuki, Kanagawa, Japan

[73] Assignee: Canon Kabushiki Kaisha, Tokyo, Japan

[21] Appl. No.: 848,895

[22] Filed: Apr. 4, 1986

Related U.S. Application Data

[63] Continuation of Ser. No. 634,411, Jul. 25, 1984, abandoned, which is a continuation of Ser. No. 360,692, Mar. 22, 1982, abandoned.

[30] Foreign Application Priority Data

Mar. 25, 1981 [JP] Japan ................... 56-43440

[51] Int. Cl.$^4$ .......................... G02B 5/18; H04N 5/72
[52] U.S. Cl. .................................. 350/162.22; 358/251
[58] Field of Search ........... 350/162.17, 162.2, 162.21, 350/162.22; 358/251

[56] References Cited

U.S. PATENT DOCUMENTS 3,821,795  6/1974  Okano .............................. 350/162.2

FOREIGN PATENT DOCUMENTS 1394712  5/1975  United Kingdom ............. 350/162.2

Primary Examiner—Bruce Y. Arnold
Attorney, Agent, or Firm—Toren, McGeady & Goldberg

[57] ABSTRACT

An optical low-pass filter has a diffraction grating structure wherein flat faces which are perpendicular to the optical axis of an imaging lens and slanting faces which are slanting relative to the flat faces are at a predetermined pitch.

4 Claims, 3 Drawing Figures

OPTICAL LOW-PASS FILTER

This is a continuation of application Ser. No. 634,411, filed July 25, 1984, now abandoned which was a continuation of application Ser. No. 360,692, filed Mar. 22, 1982 now abandoned.

BACKGROUND OF THE INVENTION

1. Field of the Invention

This invention relates to an optical low-pass filter and more particularly to an optical low-pass filter suited for a color video camera which uses a stripe filter or a color mosaic filter.

2. Description of the Prior Art

A conventional low-pass filter of this kind uses a double refractive crystal such as quartz as disclosed in a Japanese utility model publication No. SHO 47-18688.

With the low-pass filter using a double refractive crystal, an image can be divided into two images of ordinary rays and extraordinary rays and, by controlling the extent of discordance between the two images, OTF can be reduced to almost zero with respect to a desired wave length and a desired spatial frequency. However, since quartz is expensive, a less expensive low-pass filter is desired.

To meet this requirement, various low-pass filters have been proposed including a low-pass filter of a multi-planar prismatic shape disclosed in U.S. Pat. No. 3,716,666; and low-pass filters of the diffraction grating type as disclosed in Japanese patent publication No. SHO 49-20105 and laid-open Japanese patent application Nos. SHO 48-53741, SHO 53-119063 and SHO 55-48724. The present invention is directed to the preparation of a low-pass filter of the type using a diffraction grating.

SUMMARY OF THE INVENTION

It is an object of the present invention to provide a low-pass filter using a novel structured diffraction grating.

In the novel structure according to the invention, flat faces, and slanting faces which are slanting relative to the flat faces, are at a predetermined pitch.

The object and features of the invention will become apparent from the following detailed description of embodiments in conjunction with the accompanying drawings.

DETAILED DESCRIPTION OF PREFERRED EMBODIMENTS

Figure 1:
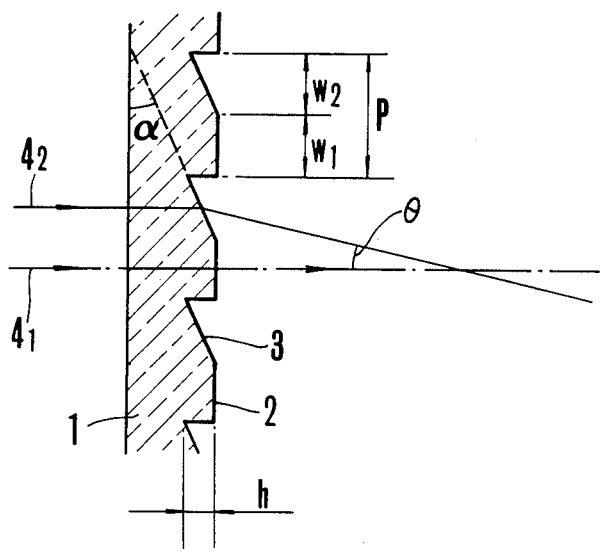
FIG. 1 is a schematic illustration of an optical low-pass filter of the phase diffraction grating type according to the present invention.

An embodiment of the present invention is shown in FIG. 1. In the optical low-pass filter 1 according to the invention, each diffraction element comprises a first facet 2 which perpendicularly intersects rays of light $4_1$ and $4_2$ which are parallel with the optical axis of an image forming optical system and a second facet 3 which slants at an angle $\alpha$ to the optical axis. Such diffraction elements are parallel at a pitch p. In this particular embodiment, the width w1 of the first facet 2 and the width w2 of the second facet 3 are in the ratio of 1:1. However, this ratio may be varied as necessary for balancing the light quantity of one image with that of the other image.

Assuming that a ⅔ inch image pick-up tube is used at a wave length of $0.6\mu$ and a red color carrier frequency of 3.6 MHz, the pitch of a stripe filter becomes abou $47\mu$. Accordingly, the required lateral shift extent is about $24\mu$. This determines a distance f from a low-pass filter to the face of a stripe filter. Then, with the distance f thus determined, the specification of the diffraction grating shown in FIG. 1 can be determined accordingly. Assuming that the refractive index at the wave length $\lambda(=0.6\mu)$ of a low-pass filter material such as an acrylic resin material, for example, is n=1.49, the angle $\theta$ at which the ray of light $4_1$ disposed in parallel relationship with the optical axis is bent by the slanting facet 3 can be expressed by the following:

$$\theta = \sin^{-1}(n \sin \alpha) - \alpha \approx (n-1)\alpha (\alpha << 1) \qquad (1)$$

Accordingly, the extent of deviation $\delta$ from a point at which the ray $4_1$ intersects an image surface without being bent can be expressed by:

$$\delta = f \tan \theta \approx f(n-1)\alpha (\alpha << 1) \qquad (2)$$

The ray of light $4_1$ incident upon the first facet 2, etc. passes through the filter without being bent. The above description represents a geometric optical view. The following consideration is described in view of physical optics.

Figure 2:
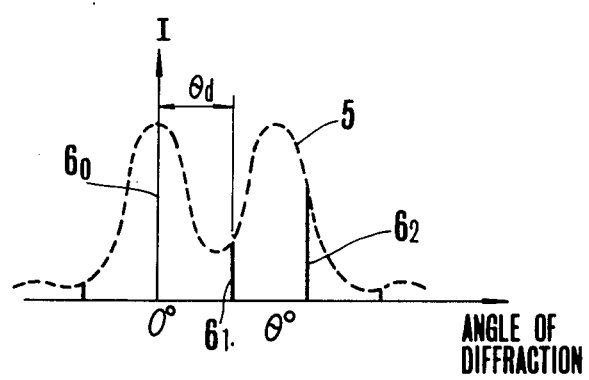
FIG. 2 is an illustration of the angle distribution of a diffracted light obtained from an ordinary diffraction grating which does not satisfy any blazed condition.

Assuming that the low-pass filter shown in FIG. 1 is considered to be a diffraction grating, the direction in which the light is transmitted and the intensity thereof are as shown in FIG. 2. In FIG. 2, the diffraction pattern of each diffraction element shown in FIG. 1 is roughly represented by a dotted line (an envelope) 5. The line 5 has peaks in the directions in which the incident ray of light is bent by the first facet 2 and the second facet 3, that is, in the directions of a degree 0 and a degree $\theta$ of the angle of diffraction.

In a diffraction grating including many diffraction elements which are at a pitch p and each of which is as described above, a diffraction light (spectrum) appears in a direction which is determined by the following formula:

$$p \sin \theta d = m\lambda (m = 0 \pm 1 \pm 2 \pm 3) \qquad (3)$$

Then, the angle of diffraction and intensity of the diffraction light at each order is determined by the product of the above stated envelope 5 and the diffraction light. In FIG. 2, the diffraction light at each order is indicated by $6_0, 6_1, 6_2, \ldots$.

In the diffraction grating type low-pass filter according to the present invention, the light passing through the first facet 2 is directed so that geometric-optical propagation coincides with the direction of the 0 order diffraction light $6_0$. Therefore, most of the light passing through the first facet 2 becomes the 0 order light. In an ordinary case, however, the direction $\theta$ in which the ray of light is bent by the second facet 3 does not always coincide with the angle at which the diffraction light of each order appears as shown in FIG. 2. If these angles coincide with each other, a strong diffraction light appears. Hereinafter this condition will be called a blazed condition. Now, with m=1 applied for Formula (3), there results:

$$\theta d_1 = \sin^{-1}(\lambda/p) \approx \lambda/p (\theta d_1 << 1) \quad (4)$$

Comparing this with Formula (1), the blazed condition can be expressed by:

$$\theta d_1 = \lambda/p = (n-1)\alpha = \theta \quad (5)$$

Meanwhile, assuming that the focal length f of the relay system of a photograph taking lens is 30 mm and, with the filter placed in front of the relay system, since the extent of lateral shift of the light $\lambda = 0.6\mu$ is $24\mu$, the result is $\theta = 4.6 \times 10^{-2}$ deg in FIG. 1. By substituting this $\theta$ in Formula (5), there results: $\alpha = 9.4 \times 10^{-2}$ deg $\approx 5.6' p = 750\mu$.

These values together with the aforementioned refractive index $n\lambda = 1.49$ define the specification of the diffraction grating low-pass filter. One of the features of the present invention is that the blazed condition is satisfied from the beginning at least by one of a plurality of facets constituting the diffraction element.

In the embodiment shown in FIG. 1, the arrangement having the angle $\alpha = 5.6'$ and the pitch $p = 750\mu$ gives a height of the diffraction grating $h \approx 0.6\mu$. However, making the height h a little higher than that facilitates manufacturing and is preferable for that reason. One of solutions to this problem is to make use of a blazed diffraction grating to produce diffracted rays of light to higher order as m=2 in formula (3), thereby $h = 1.2 \mu m$ for $\alpha = 5.6'$, $p = 1500 \mu m$ is realized. Further, by making the filter to be positioned nearer to the image plane, it is possible to reduce the pitch P of the diffraction grating.

Figure 3:
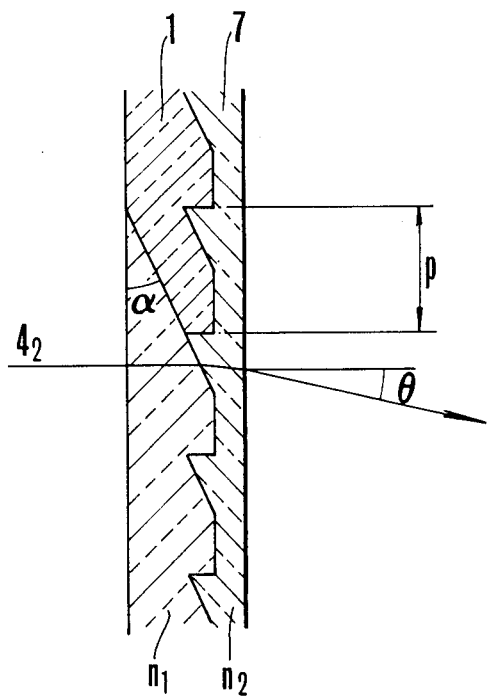
FIG. 3 is an illustration of the structural arrangement of a filter which is prepared by cutting deep grooves to obtain the same low-pass filter performance in cases where it is difficult to prepare a diffraction grating with shallow grooves.

Another solution is shown in FIG. 3. Referring now to FIG. 3, the low-pass filter which is of a diffraction grating structure has a principal element 1 and a transparent coating material 7. Assuming that the refractive index $n_1$ of the low-pass filter is 1.49 and the refractive index $n_2$ of the coating material 1.45, the pitch p of the grating and the angle of diffraction $\theta$ are the same as those of the embodiment shown in FIG. 1 by obtaining the following through a simple calculation:

$$\alpha = 1.8° \ (h=12\mu)$$

Accordingly, this will assure a smaller machining error.

Furthermore, in FIG. 3, the refractive index of the coating layer 7 may be high relative to that of the phase grating substrate. Compared with a low-pass filter made from a double refractive crystal plate, the phase diffraction grating type low-pass filter of the present invention is obtainable at a low cost. With regard to performance, since the above stated phase diffraction grating satisfies the blazed condition in two principal diffraction directions, the invented filter excels in image separating power (or a laterally shifting power). Since an 0 order light is used in one of the two directions, the extent of lateral shift remains unvaried by wave length. Furthermore, unlike double refractive crystals, the filter remains unaffected by a polarized light. These are the advantageous features of the filter according to the invention.

In molding the low-pass filter, corners of the sectional shape of the diffraction grating shown in FIG. 1 might somewhat become blunt. However, a shape having blunt corners still remains within the scope of the present invention.

While the embodiment of the invention has been described in the foregoing with stress laid upon the structural arrangement of the low-pass filter having a one dimensional diffraction grating, it is to be understood that the low-pass filter of the invention can be a two dimensional structure in accordance with the two dimensional arrangement of a sensor array.

What is claimed is:

1. An optical low-pass filter having a blazed diffraction grating structure arranged in an image-forming light beam, said diffraction grating structure being assymetrical and being formed of plural diffraction elements, each element comprising a first face almost perpendicular to the optical axis of the light beam, a second face inclined thereto, and a third face arranged almost parallel to said optical axis, said plural elements being arranged so that said first and second faces of said elements have a predetermined pitch.

2. An optical low-pass filter according to claim 1, wherein the first faces are arranged in an embedded state.

3. An optical low-pass filter having a blazed diffraction grating structure arranged in an image-forming light beam, said diffracton grating structure being assymetrical and being formed of plural diffraction elements, each element comprising a first face almost perpendicular to the optical axis of the light beam, a second face inclined thereto, and a third face almost parallel to said optical axis, said third faces being arranged between said first and second faces, said plural elements being arranged so that said first and second faces of said elements have a predetermined pitch.

4. An optical low-pass filter having a blazed diffraction grating structure arranged in an image forming light beam, said diffraction grating structure being assymetrical and being formed of plural diffraction elements, each element comprising a first face almost perpendicular to the optical axis of the light beam, a second face inclined thereto, and a third face arranged almost parallel to the optical axis, said first faces for emitting zero-order diffraction light, said second faces for emitting a diffracted light, said first and second faces being arranged with a predetermined pitch for concentrating the intensity of the diffracted light in two directions.

* * * * *